(12) United States Patent
Abdel-Rahman (10) Patent No.: US 11,986,810 B1
(45) Date of Patent: May 21, 2024

(54) SELECTIVE REDUCTION CATALYST OF α,β-UNSATURATED KETONE USING ELECTRONICALLY WEAKLY COUPLED 4,4'-DIVINYLAZOARYLENE-BRIDGED DIRUTHENIUM COMPLEX BEARING TWO Ru(CO)(8-MERCAPTOQUINOLATO($P^iPr_3$)$_2$ MOIETIES

(71) Applicant: KING FAISAL UNIVERSITY, Al-Ahsa (SA)

(72) Inventor: Obadah Subhi Abdel-Rahman, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/405,177

(22) Filed: Jan. 5, 2024

(51) Int. Cl.
| | |
|---|---|
| *B01J 31/24* | (2006.01) |
| *B01J 31/20* | (2006.01) |
| *B01J 31/22* | (2006.01) |
| *B01J 37/02* | (2006.01) |
| *B01J 37/03* | (2006.01) |
| *B01J 37/04* | (2006.01) |
| *B01J 37/06* | (2006.01) |
| *C07F 15/00* | (2006.01) |

(52) U.S. Cl.
CPC .......... *B01J 31/2409* (2013.01); *B01J 31/20* (2013.01); *B01J 31/226* (2013.01); *B01J 31/2291* (2013.01); *B01J 31/2295* (2013.01); *B01J 37/0236* (2013.01); *B01J 37/031* (2013.01); *B01J 37/04* (2013.01); *B01J 37/06* (2013.01); *C07F 15/0046* (2013.01); *B01J 2231/643* (2013.01); *B01J 2531/0205* (2013.01); *B01J 2531/821* (2013.01)

(58) Field of Classification Search
CPC .................................................... B01J 31/2409
USPC .......................................................... 546/4
See application file for complete search history.

(56) References Cited

U.S. PATENT DOCUMENTS 3,660,458 A    5/1972  Trotz et al.

OTHER PUBLICATIONS

Abdel-Rahman, et al.; "1,4-Divinylphenylene-bridged diruthenium complexes with 2-hydroxypyridine- and 2- or 8-hydroxyquinoline-olate ligands"; From the journal Zeitschrift für Naturforschung B https://doi.org/10.1515/znb-2022-0303, Published by De Gruyter Mar. 8, 2023 (abstract only).

Warad, et al.; "New catalysts for the chemoselective reduction of α, β-unsaturated ketones: Synthesis, spectral, structural and DFT characterizations of mixed ruthenium(II) complexes containing 2-ethene-1,3-bis(diphenylphosphino) propane and diamine ligands"; Polyhedron vol. 63, Oct. 31, 2013, pp. 182-188.

Maurer, et al.; "Divinylphenylene-Bridged Diruthenium Complexes Bearing Ru(CO)Cl(PiPr3)2 Entities"; Organometallics 2006, 25, 15, 3701-3712, Publication Date: Jun. 16, 2006 https://doi.org/10.1021/om0602660 Copyright © 2006 American Chemical Society.

Man, et al.; "Spectroscopic and Computational Studies of the Ligand Redox Non-Innocence in Mono- and Binuclear Ruthenium Vinyl Complexes"; Organometallics 2011, 30, 7, 1852-1858 Publication Date: Mar. 10, 2011 https://doi.org/10.1021/om1010534.

Abdel-Rahman, et al.; "Polyelectrochromism and electronic coupling in vinylruthenium-modified carbazoles"; Journal of Organometallic Chemistry, vols. 849-850, Nov. 1, 2017, pp. 98-116, https://doi.org/10.1016/j.jorganchem.2017.05.010.

Lindner, et al.; "Asymmetric hydrogenation of an α,β-unsaturated ketone by diamine(ether-phosphine)ruthenium(II) complexes and lipase-catalyzed kinetic resolution: A consecutive approach"; Apr. 2003 Tetrahedron Asymmetry 14(8):1045 DOI:10.1016/S0957-4166(03)00129-0.

Hafeez, et al.; "Synthesis of ruthenium complexes and their catalytic applications: A review"; Arabian Journal of Chemistry vol. 15, Issue 11, Nov. 2022, 104165.

Esteruelas, et al.; "Reactions of RuHCl(CO)(PiPr3)2 with Alkyn-1-ols: Synthesis of Ruthenium(II) Hydroxyvinyl and Vinylcarbene Complexes"; Organometallics 1994, 13, 11, 4258-4265 Publication Date: Nov. 1, 1994 https://doi.org/10.1021/om00023a031.

Root, et al.; "Nucleophilicity of thiolato sulfur when coordinated to ruthenium(II). Kinetics of the alkylation of (8-mercaptoquinolinato)bis(2,2'-bipyridine)ruthenium(II) by iodomethane"; Inorg. Chem. 1984, 23, 5, 622-624, Publication Date: Feb. 1, 1984 https://doi.org/10.1021/ic00173a028.

*Primary Examiner* — Taofiq A Solola
(74) *Attorney, Agent, or Firm* — Nath, Goldberg & Meyer; Richard C. Litman (57) ABSTRACT

A 4,4'-divinylazoarylene-bridged diruthenium complex with a general formula $[\{Ru(CO)(L-\kappa^2[N,S]^-)(P^iPr_3)_2\}_2(\mu-\{CH=CH-C_6H_2-(^iPr)_2-2,6\}_2-N=N-4,4')]$, its synthesis, and its use as an catalyst in inorganic processes.

13 Claims, 3 Drawing Sheets

SELECTIVE REDUCTION CATALYST OF α,β-UNSATURATED KETONE USING ELECTRONICALLY WEAKLY COUPLED 4,4'-DIVINYLAZOARYLENE-BRIDGED DIRUTHENIUM COMPLEX BEARING TWO Ru(CO)(8-MERCAPTOQUINOLATO($P^iPr_3$)$_2$ MOIETIES

BACKGROUND

1. Field

The present disclosure relates to a 4,4'-divinylazoarylene-bridged diruthenium complex with a general formula [{Ru(CO)(L-$\kappa^2$[N,S]$^-$)($P^iPr_3$)$_2$}$_2$($\mu$—{CH=CH—$C_6H_2$—($^iPr$)$_2$-2,6}$_2$—N=N-4,4')], its synthesis, and its use as a catalyst for organic compounds.

2. Description of the Related Art

Since the discovery of metal hydrido complexes of the type {[HM(CO)Cl(PR$_3$)$_2$] (M=Ru; Os, R=Ph; Me; cyclohexyl; $^iPr$)} in the 1960s, considerable interest has been focused on the pivotal catalytic activates of such chemical families towards selective hydrogenation of terminal olefins and alkynes, the coupling of terminal alkynes with carboxylic acid-derived compounds, the dehydrogenation of alcohol to ketones, dialdehydes to lactones, and in particular on regio- and stereospecific insertion of the ruthenium-hydride bond into a terminal —C≡CH bond of the alkyne substrates to form the metal-alkenyl (vinyl) type-families. Thus, the first series of mononuclear metal-alkenyl type-complexes were successfully reported in the late 1980s.

More recently, interest in (multi)ruthenium-alkenyl type-complexes has been intensively scrutinized in terms of redox chemistry, electronic coupling, electroswitchable poly-electrochromic near infrared (NIR) dyes, tri-, tetra-, and hexametal-organic macrocycles and antiproliferative effects in tumor cell lines.

As these complexes have attracted widespread interest, divinylarylene-bridged diruthenium complexes of the general type [{Ru(CO)(Cl)($P^iPr_3$)$_2$}$_2$($\mu$—CH=CH—Ar—CH=CH—)] {Ar=bridging π-conjugated arylene linker} have been investigated and revealed to exhibit two consecutive, chemically and electrochemically, well-behaved, reversible one-electron oxidations at well-accessible potentials. The half-wave redox splitting, $\Delta E_{1/2} = E_{1/2}^{+/2+} - E_{1/2}^{0/+}$, between their two individual redox one-electron oxidations waves depends on the π-conjugated arylene linker "bridge" and can be ranged to be well-separated (strongly coupled) as in the case of five-membered 2,5-N-arylpyrroles- or -furanes- or -thiophenes heterocycles arylene linkers; moderately coupled as in 4,4'-biphenylenes, 2,2'-bipyridines, and many others arylene linkers; or weakly coupled as in the case of the enforced π-stacking of the two phenyl rings in para-[2.2]- or ortho-[2.1]-cyclophanes linkers.

Homogeneous catalysts of transition metal complexes are of great interest for synthesizing fine-chemical/specialty chemical/medical and pharmaceutical products for their high activity and modified chemo-, stereo- and regio-selectivity advantages within the widely used cross coupling reaction of C—C, C—O, C—N and C—S bonding. The most recent chemical transformation consumes high energy for selective productivity. Accordingly, designing novel and more effective homogeneous metal-organic complex catalysts is an essential demand in the industrial fields. Hence, the catalytic reactivity of the homogeneous metal-organic complex catalysts is influenced by the nature of both the central metal ion and the coordinated backbone ligands.

SUMMARY

The present subject matter is directed to the chemoselectivity reduction of α,β-unsaturated ketones, electrochemical electronic coupling, polyelectrochromic behavior, and spectro(electro)scopic features of 4,4'-divinylazoarylene-bridged bis(ruthenium-alkenyl) moieties terminated via deprotonated chelating, bidentate 8-mercaptoquinolato co-ligands.

Accordingly, the present subject matter relates to a novel 4,4'-divinylazoarylene-bridged diruthenium complex with a general formula [{Ru(CO)(L-$\kappa^2$[N,S]$^-$)($P^iPr_3$)$_2$}$_2$($\mu$—{CH=CH—$C_6H_2$—($^iPr$)$_2$-2,6}$_2$—N=N-4,4')], [dRu8NS] with $\kappa^2$[N,S]$^-$-chelating of 8-mercaptoquinolato that has been successfully prepared. This novel, six-coordinated, octahedral, 18-valence electrons (VEs) type-complex [dRu8NS] was accessible in quantitative yields via substitution of the two chloro ligands of the five coordinated precursor complex [{Ru(CO)(L-$\kappa^2$[N,S]$^-$)($P^iPr_3$)$_2$}$_2$($\mu$—{CH=CH—$C_6H_2$—($^iPr$)$_2$-2,6}$_2$—N=N-4,4')] with the corresponding deprotonated 8-mercaptoquinoline in a $CH_2Cl_2$/MeOH solvent mixture.

Complex [dRu8NS] was routinely characterized in its neutral state by classical IR, UV/Vis and NMR spectroscopy technique, and in its two accessible oxidized states by IR, UV/Vis/NIR spectroelectrochemistry along with electrochemical techniques. Electrochemical studies on the [dRu8NS] complex revealed to a single chemically and electrochemically reversible two-electrons oxidation redox wave referring to noteworthy negligible communication between the two remote redox-active end-groups. The obtained results for the complex [dRu8NS] acquiesce with dominant contributions of the π-conjugated divinylazoarylene bridge to the two redox processes and an even delocalization of the electron hole and spin density over the entire π-conjugated divinylazoarylene diruthenium backbone with only minor involvement of the peripherally attached $\kappa^2$[N,S]$^-$ donor ligands. Complex [dRu8NS] shows also remarkable chemoselectivity reduction of α,β-unsaturated ketone giving the corresponding α, β-unsaturated alcohol.

In an embodiment, the present subject matter relates to a 4,4'-divinylazoarylene-bridged diruthenium complex with a general formula [{Ru(CO)(L-$\kappa^2$[N,S]$^-$)($P^iPr_3$)$_2$}$_2$($\mu$—{CH=CH—$C_6H_2$—($^iPr$)$_2$-2,6}$_2$—N=N-4,4')] and having the formula I:

In one more embodiment, the present subject matter relates to a method of making a 4,4'-divinylazoarylene-bridged diruthenium complex with a general formula [{Ru(CO)(L-κ²[N,S]⁻)(P$^i$Pr$_3$)$_2$}$_2$(μ—{CH═CH—C$_6$H$_2$—($^i$Pr)$_2$-2,6}$_2$—N═N-4,4')], the method comprising: stiffing a mixture of 8-mercaptoquinoline and K$_2$CO$_3$ in a solvent mixture of CH$_2$Cl$_2$ and MeOH to obtain a solution; adding the solution to a solution of [{Ru(CO)(L-κ²[N,S]⁻)(P$^i$Pr$_3$)$_2$}$_2$(μ—{CH═CH—C$_6$H$_2$—($^i$Pr)$_2$-2,6}$_2$—N═N-4,4')] in a solvent of CH$_2$Cl$_2$ to obtain a reaction mixture; stiffing the reaction mixture; removing the solvents under reduced pressure to obtain a precipitate; washing the precipitate; drying the precipitate in vacuum; and obtaining the 4,4'-divinylazoarylene-bridged diruthenium complex with a general formula [{Ru(CO)(L-κ²[N,S]⁻)(P$^i$Pr$_3$)$_2$}$_2$(μ—{CH═CH—C$_6$H$_2$—($^i$Pr)$_2$-2,6}$_2$—N═N-4,4')].

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a novel 4,4'-divinylazoarylene-bridged diruthenium complex with a general formula [{Ru(CO)(L-$\kappa^2$[N,S]$^-$)(P$^i$Pr$_3$)$_2$}$_2$($\mu$—{CH=CH—C$_6$H$_2$—($^i$Pr)$_2$-2,6}$_2$—N=N-4,4')], [dRu8NS] with $\kappa^2$[N,S]$^-$-chelating of 8-mercaptoquinolato.

Complex [dRu8NS] was routinely characterized in its neutral state by classical IR, UV/Vis and NMR spectroscopy technique, and in its two different accessible oxidized states by IR, UV/Vis/NIR spectroelectrochemistry along with electrochemical techniques. Electrochemical studies on the [dRu8NS] complex revealed to a single chemically and electrochemically reversible two-electrons oxidation redox wave referring to noteworthy negligible communication between the two remote redox-active end-groups. The obtained results for the complex [dRu8NS] acquiesce with dominant contributions of the $\pi$-conjugated divinylazoarylene bridge to the two redox processes and an even delocalization of the electron hole and spin density over the entire $\pi$-conjugated divinylazoarylene diruthenium backbone with only minor involvement of the peripherally attached $\kappa^2$[N,S]$^-$ donor ligands. Complex [dRu8NS] shows also remarkable chemoselectivity reduction of $\alpha,\beta$-unsaturated ketone giving the corresponding $\alpha,\beta$-unsaturated alcohol.

The present complex is accessible in quantitative yields via substitution of the two chloro ligands of the five-coordinated precursor complex [{Ru(CO)(L-$\kappa^2$[N,S]$^-$)(P$^i$Pr$_3$)$_2$}$_2$($\mu$—{CH=CH—C$_6$H$_2$—($^i$Pr)$_2$-2,6}$_2$—N=N-4,4')] with the corresponding deprotonated 8-mercaptoquinoline in a CH$_2$Cl$_2$/MeOH solvent mixture. This six-coordinated, octahedral, 18-valence electrons (VEs) type-complex [dRu8NS] was routinely characterized in its neutral state by classical IR, UV/Vis and NMR spectroscopy techniques, and in its two accessible oxidized states by IR, UV/Vis/NIR spectroelectrochemistry along with electrochemical techniques.

Electrochemical studies on the complex [dRu8NS] revealed to a single chemically and electrochemically reversible two-electrons oxidation redox wave referring to noteworthy negligible communication between the two remote redox-active end-groups. All the electrochemical, IR and UV/Vis/NIR spectro(electro)scopic results on complex [dRu8NS] confirmed perspectives with dominant contributions of the $\pi$-conjugated divinylazoarylene bridge to the two redox processes and an even delocalization of the electron hole and spin density over the entire $\pi$-conjugated divinylazoarylene diruthenium backbone with only minor involvement of the peripherally attached $\kappa^2$[N,S]$^-$ donor ligands. Complex [dRu8NS] shows remarkable chemo-selectivity reduction of $\alpha,\beta$-unsaturated ketone giving the corresponding $\alpha,\beta$-unsaturated alcohol.

In an embodiment, the present subject matter relates to a 4,4'-divinylazoarylene-bridged diruthenium complex with a general formula [{Ru(CO)(L-$\kappa^2$[N,S]$^-$)(P$^i$Pr$_3$)$_2$}$_2$($\mu$—{CH=CH—C$_6$H$_2$—($^i$Pr)$_2$-2,6}$_2$—N=N-4,4')] having the formula I:

by IR, UV/Vis/NIR spectroelectrochemistry along with electrochemical techniques. Electrochemical studies on the [dRu8NS] complex revealed to a single chemically and electrochemically reversible two-electrons oxidation redox wave referring to noteworthy negligible communication between the two remote redox-active end-groups. The obtained results for the complex [dRu8NS] acquiesce with dominant contributions of the $\pi$-conjugated divinylazoarylene bridge to the two redox processes and an even delocalization of the electron hole and spin density over the entire $\pi$-conjugated divinylazoarylene diruthenium backbone with only minor involvement of the peripherally attached $\kappa^2$[N,S]$^-$ donor ligands. Complex [dRu8NS] shows To investigate the electrochemical electronic coupling, polyelectrochromic behavior, and spectro(electro)scopic features of bis(ruthenium-alkenyl) moieties incorporated into 4,4'-azoarylene bridge linker and terminated with deprotonated, 8-mercaptoquinolato as monoanionic, chelating, bidentate co-ligands, a novel [{Ru(CO)(L-$\kappa^2$[N,S]$^-$)(P$^i$Pr$_3$)$_2$}$_2$($\mu$—{CH=CH—C$_6$H$_2$—($^i$Pr)$_2$-2,6}$_2$—N=N-4,4')], [dRu8NS], complex, where the two ruthenium-vinyl end-groups incorporated into the two para-positions on the azoarylene is prepared, while the electron-richness of the ortho-positions are amplified by four bulky $^i$Pr groups as per Scheme 1.

Scheme 1

[dRu8NS]

This six-coordinated, octahedaral, bis(ruthenium-alkenyl) type-complex [dRu8NS] can be classically prepared in high yields via substitution of the two chloro ligands of the precursor complex [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] with the corresponding deprotonated 8-mercaptoquinoline in a CH$_2$Cl$_2$/MeOH solvent mixture according to a routine protocol in a stoichiometric ratio of 1:2. Upon addition of the solution of the deprotonated chelate 8-mercaptoquinoline, the reaction solution color changes promptly from red to pale yellow with the concomitant precipitation of KCl. Complex [dRu8NS] is routinely characterized in its neutral state by conventional IR, UV/Vis and NMR spectroscopy and analytical techniques, and in its two different reachable oxidized states by IR, UV/Vis/NIR spectroelectrochemistry. $^1$H-NMR spectrum of complex [dRu8NS] as shows a classical doublet at δ9.12 ppm and a doublet of triplet at δ6.57 ppm of the four equivalent vinylic protons Ru—CH=(H$_1$) and Ru—CH=CH (H$_2$) with a large coupling constant $^3J_{H-H}$ of about 14.0 Hz, respectively. This high coupling constant confirms a trans-geometry at the two vinylic double bonds.

Figure 3:
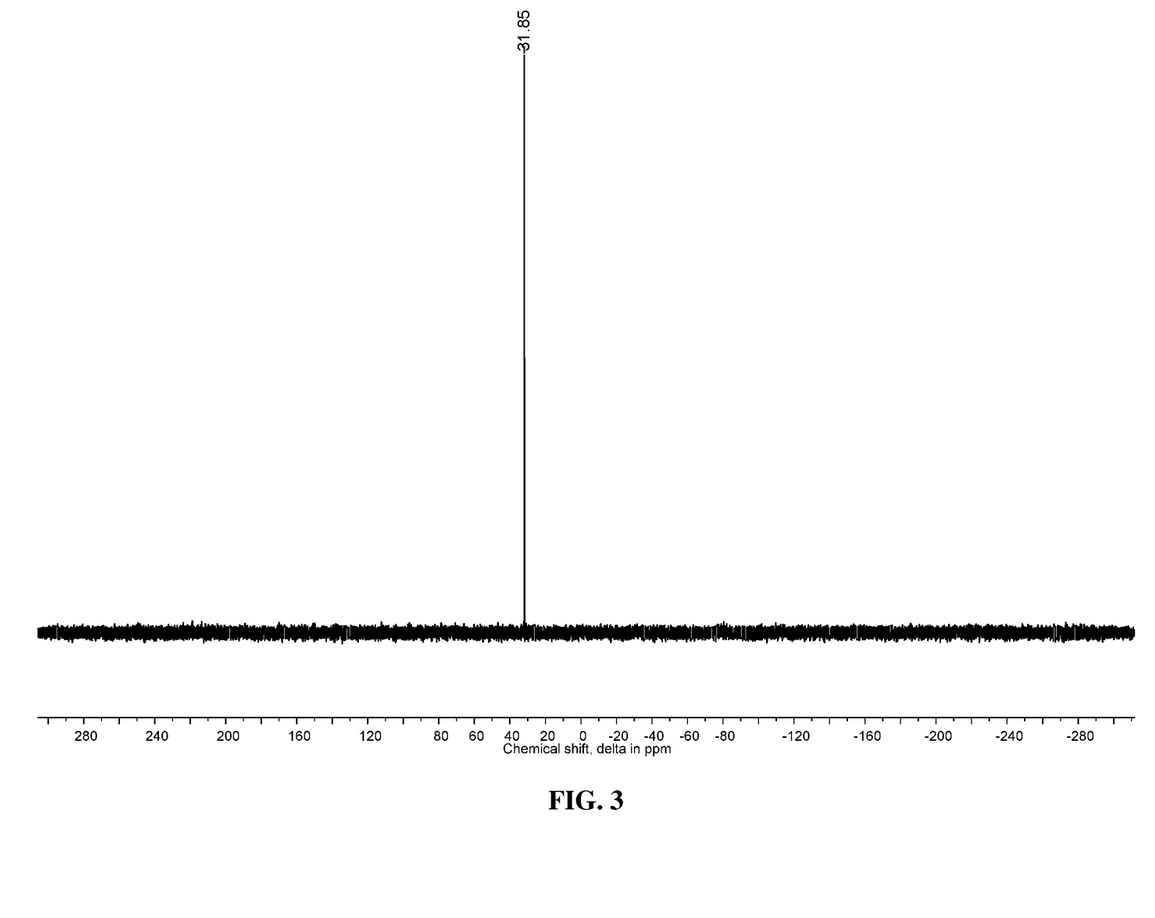
FIG. 3 shows a $^{31}$P-NMR spectrum (162 MHz, CD$_2$Cl$_2$) of complex [dRu8NS].

$^{31}$P-NMR spectrum of complex [dRu8NS] as depicted in FIG. 3, like other ruthenium-alkenyls of a similar family, shows a sharp singlet resonance at δ=31.85 ppm, confirming that the four P$^i$Pr$_3$ ligands are chemically equivalent in which two of them are trans-disposed at each {Ru} end-groups.

In one embodiment, the present compound can be prepared according to the general synthetic pathway of Scheme 1 above and as herein described. Specifically, synthesis commences with equimolar amounts of 8-mercaptoquinoline and K$_2$CO$_3$ being stirred at room temperature in a solvent mixture of CH$_2$Cl$_2$ and MeOH for about 15 min. This solution is slowly added via cannula to a solution of the complex [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] in CH$_2$Cl$_2$. After complete addition, stirring is continued for about one further hour at room temperature to give a deep yellow solution. The solvents are removed under reduced pressure and the yellow precipitate is washed twice with n-hexane and MeOH, each to remove unreacted starting material and any formed KCl. The resulting residue is then dried in vacuum.

Stated more generally, in one more embodiment, the present subject matter relates to a method of making a 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')], the method comprising: stirring a mixture of 8-mercaptoquinoline and K$_2$CO$_3$ in a solvent mixture of CH$_2$Cl$_2$ and MeOH to obtain a solution; adding the solution to a solution of [{Ru(CO)(L-κ²[N,S]⁻)(P$^i$Pr$_3$)$_2$}$_2$(μ—{CH=CH—C$_6$H$_2$—($^i$Pr)$_2$-2, 6}$_2$—N=N-4,4')], in a solvent of CH$_2$Cl$_2$ to obtain a reaction mixture; stirring the reaction mixture; removing the solvents under reduced pressure to obtain a precipitate; washing the precipitate; drying the precipitate in vacuum; and obtaining the 4,4'-divinylazoarylene-bridged diruthenium complex with a general formula [{Ru(CO)(L-κ²[N, S]⁻)(P$^i$Pr$_3$)$_2$}$_2$(μ—{CH=CH—C$_6$H$_2$—($^i$Pr)$_2$-2,6}$_2$—N=N-4,4')].

In an embodiment of the present production methods, the solution of 8-mercaptoquinoline and K$_2$CO$_3$ in the solvent mixture of CH$_2$Cl$_2$ and MeOH can be stirred for at least about 15 minutes, or about 15 minutes. In an additional embodiment, the solution of 8-mercaptoquinoline and K$_2$CO$_3$ in the solvent mixture of CH$_2$Cl$_2$ and MeOH can be stirred at room temperature.

In another embodiment of the present production methods, the 8-mercaptoquinoline and the K$_2$CO$_3$ can be added in equimolar amounts. Similarly, the CH$_2$Cl$_2$ and MeOH in the solvent mixture of CH$_2$Cl$_2$ and MeOH can be used in equal volumetric amounts.

In an embodiment of the present production methods, the reaction mixture can be stirred for at least about 1 hour, or about 1 hour. In an additional embodiment, the reaction mixture can be stirred at room temperature. In a further embodiment, the stirring obtains a deep yellow solution.

In an embodiment of the present production methods, the precipitate can be yellow.

In another embodiment of the present production methods, the precipitate can be washed with n-hexane and MeOH. In this regard, the precipitate can be washed twice with each of the n-hexane and MeOH. In further embodiments, equal volumetric amounts of the n-hexane and MeOH can be used. This washing of the precipitate may remove unreacted starting materials and any formed KCl.

In an additional embodiment of the present production methods, the 4,4'-divinylazoarylene-bridged diruthenium complex with a general formula [{Ru(CO)(L-$\kappa^2$[N,S]$^-$)(P$^i$Pr$_3$)$_2$}$_2$($\mu$—{CH=CH—C$_6$H$_2$—($^i$Pr)$_2$-2,6}$_2$—N=N-4,4')] can be obtained in an about 94% yield.

The following examples relate to various methods of manufacturing the specific compounds and application of the same, as described herein. All compound numbers expressed herein are with reference to the synthetic pathway figure shown above.

EXAMPLES

Example 1

Preparation of [{Ru(CO)(L-$\kappa^2$[N,S]$^-$)(P$^i$Pr$_3$)$_2$}$_2$($\mu$—{CH=CH—C$_6$H$_2$—($^i$Pr)$_2$-2,6}$_2$ —N=N-4,4')], [dRu8NS] complex Equimolar amounts of 8-mercaptoquinoline (1.1 mmol, 177 mg, 2.2 eq.) and K$_2$CO$_3$ (152 mg, 1.1 mmol, 2.2 eq.) were stirred at room temperature in a solvent mixture of 7 mL of CH$_2$Cl$_2$ and 7 mL of MeOH for 15 min. This solution was slowly added via cannula to a solution of 442 mg (0.5 mmol, 1 eq.) of the complex [{Ru(CO)(L-$\kappa^2$[N,S]$^-$)(P$^i$Pr$_3$)$_2$}$_2$($\mu$—{CH=CH—C$_6$H$_2$—($^i$Pr)$_2$-2,6}$_2$—N=N-4,4')] in 7 mL of CH$_2$Cl$_2$. After complete addition, stirring was continued for one further hour at room temperature to give a deep yellow solution. The solvents were removed under reduced pressure and the yellow precipitate was washed twice with 10 ml of n-hexane and 10 ml of MeOH each to remove unreacted starting material and the formed KCl. The resulting residue was then dried in vacuum.

1.1 mmol of 8-mercaptoquinoline yielded 550 mg (0.47 mmol, 94%) of complex [dRu8NS]. Elemental analysis calcd. for C$_{84}$H$_{132}$N$_4$O$_3$P$_4$Ru$_2$S: C: 62.90; H: 8.29; N: 3.49; S: 2.00. Found C: 62.75%; H: 8.22%; N: 3.47; S: 1.99%. UV-Vis ($\lambda$max (nm), $\varepsilon$ (M$^{-1}$·cm$^{-1}$)): 249 (3.3·10$^4$), 277 (3.8·10$^4$), 399 (3.4·10$^4$), 505 (1.8·10$^4$). IR (ATR, $\upsilon$ in cm$^{-1}$): 2965, 2923 (C—H aryl, vinyl); 1898 (C≡O); 1590, 1565, 1475 (C=C aryl, vinyl); 1585 (C=N); 1320 (N=N). $^1$H-NMR (400 MHz, CD$_2$Cl$_2$): $\delta$: 9.12 (d, 2H, $^3$J$_{H(1)-H(2)}$=17.0 Hz, H$_{(1)}$), 8.98 (dd, 2H, $^3$J$_{H(9)-H(8)}$=4.7 Hz, $^4$J$_{H(9)-H(7)}$=0.4 Hz, H$_{(9)}$), 8.09 (d, 2H, $^3$J$_{H(7)-H(8)}$=8.3 Hz, H$_{(7)}$), 7.47 (t, 2H, $^3$J$_{H(5)-H(4)}$=7.9 Hz, $^3$J$_{H(5)-H(6)}$=7.7 Hz, H$_{(5)}$), 7.35 (dd, 2H, $^3$J$_{H(8)-H(7)}$=8.3, $^3$J$_{H(8)-H(9)}$=4.7 Hz, H$_{(8)}$), 7.25 (s, 4H, H$_{(4)}$), 6.89 (d, 2H, $^3$J$_{H(4)-H(5)}$=7.9 Hz, H$_{(4)}$), 6.85 (d, 2H, $^3$J$_{H(6)-H(5)}$=7.7 Hz, H$_{(6)}$), 6.75 (dt, 2H, $^3$J$_{H(2)-H(1)}$=17.0 Hz, $^4$J$_{H(2)-P}$=2.0 Hz, H$_{(2)}$), 3.25 (hept, 4H, $^3$J=6.7 Hz, CH(CH$_3$)$_2$), 2.77 (m, 12H, CHP(CH$_3$)$_2$), 1.31 (m, 72H, (CH$_3$)$_2$PCH), 1.14 (d, 24H, $^3$J=6.7 Hz, (CH$_3$)$_2$CH) ppm. $^{31}$P-NMR (162 MHz, CD$_2$Cl$_2$) as depicted in FIG. 3 (400 MHz, CD$_2$Cl$_2$): $\delta$: 31.85 (s, P$^i$Pr$_3$) ppm.

Example 2

NMR Characterization

NMR Characterization
To investigate the electrochemical electronic coupling, polyelectrochroic behavior, and spectro(electro)scopic features of bis(ruthenium-alkenyl) moieties incorporated into 4,4'-azoarylene bridge linker and terminated with deprotonated, 8-mercaptoquinolato as monoanionic, chelating, bidentate co-ligands, a novel [{Ru(CO)(L-$\kappa^2$[N,S]$^-$)(P$^i$Pr$_3$)$_2$}$_2$($\mu$—{CH=CH—C$_6$H$_2$—($^i$Pr)$_2$-2,6}$_2$—N=N-4,4')], [dRu8NS] complex was successfully prepared where the two ruthenium-vinyl end-groups are incorporated into the two para-positions on the azoarylene while the electron-richness of the ortho-positions are amplified by four bulky $^i$Pr groups as depicted in Scheme 1 previously illustrated.

This six-coordinated, octahedaral, bis(ruthenium-alkenyl) type-complex [dRu8NS] was classically prepared in high yields via substitution of the two chloro ligands of the precursor complex [{Ru(CO)(L-$\kappa^2$[N,S]$^-$)(P$^i$Pr$_3$)$_2$}$_2$($\mu$—{CH=CH—C$_6$H$_2$—($^i$Pr)$_2$-2,6}$_2$—N=N-4,4')] with the corresponding deprotonated 8-mercaptoquinoline in a CH$_2$Cl$_2$/MeOH solvent mixture according to a routine protocol in a stoichiometric ratio of 1:2. Upon addition of the solution of the deprotonated chelate 8-mercaptoquinoline, the reaction solution color changed promptly from red to pale yellow with the concomitant precipitation of KCl. Complex [dRu8NS] was routinely characterized in its neutral state by conventional IR, UV/Vis and NMR spectroscopy and analytical techniques, and in its two different reachable oxidized states by IR, UV/Vis/NIR spectroelectrochemistry. $^1$H-NMR spectrum of complex [dRu8NS] shows a classical doublet at $\delta$ 9.12 ppm and a doublet of triplet at $\delta$ 6.57 ppm of the four equivalent vinylic protons Ru—CH=(H$_1$) and Ru—CH=CH (H$_2$) with a large coupling constant $3J_{H-H}$ of about 14.0 Hz, respectively. This high coupling constant confirms a trans-geometry at the two vinylic double bonds. $^{31}$PNMR spectrum of complex [dRu8NS] as depicted in FIG. 3, like other ruthenium-alkenyls of a similar family, shows a sharp singlet resonance at $\delta$=31.85 ppm, confirming that the four P$^i$Pr$_3$ ligands are chemically equivalent in which two of them are trans-disposed at each {Ru} end-groups.

Electrochemistry
The redox behavior of azoarylene-bridged bis(ruthenium-vinyl) complex [dRu8NS] was initially scrutinized by cyclic voltammetry (CV) and square-wave voltammetry (SWV) techniques to probe the electrochemical properties and the extend of the electronic interaction (coupling) between the two ruthenium vinyl moieties. The experiments were performed in CH$_2$Cl$_2$/n-NBu$_4^+$PF$_6^-$ or NBu$_4^+$TFPB$^-$, TFPB$^-$=B[{(C$_6$H$_3$(CF$_3$)$_2$-3,5]}$_4$) (0.1 M) as the supporting electrolytes. The latter electrolyte was employed because of its very weakly coordinating TFPB anion, which usually enhances the splitting of the two close redox-waves as it interacts very weakly with the positive charges generated on stepwise oxidation.

Figure 1A:
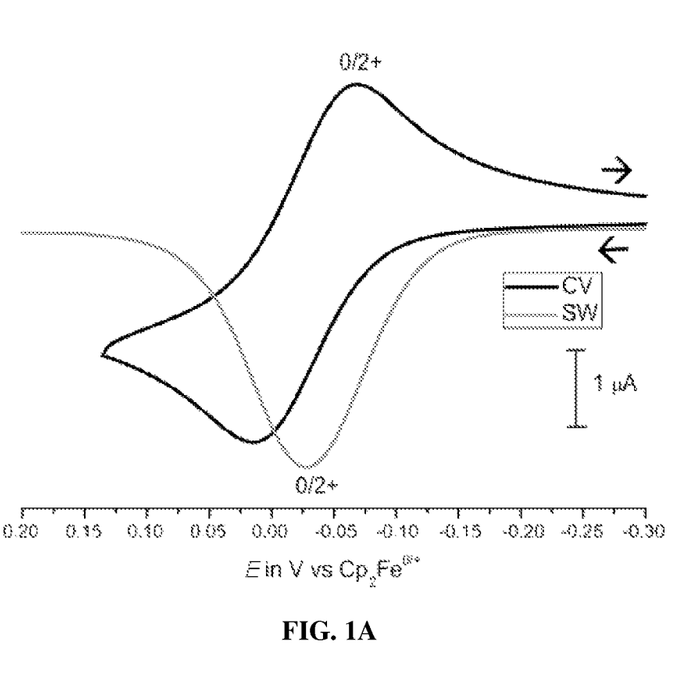
Figs. 1A and 1B show Cyclic (CV) and square-wave (SW) voltammograms of complex [dRu8NS] vs. Cp$_2$Fe$^{0/+}$ in CH$_2$Cl$_2$/n-NBu$_4$PF$_6$ (FIG. 1A) and NBu$_4$TFPB (FIG. 1B) at a scan rate v=0.1 V s$^{-1}$ or at step potential of 4 mV and a frequency of 15 Hz.
Figure 1B:
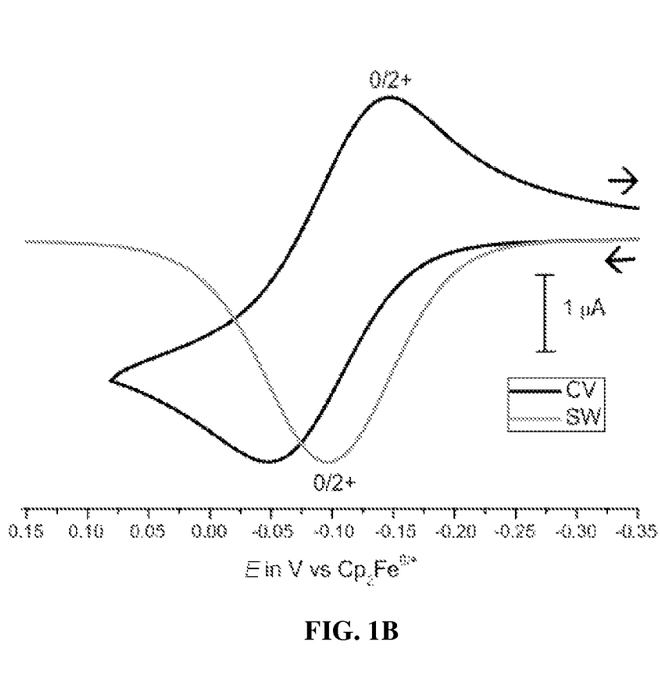

FIGS. 1A-1B shows the CV and SWV of the complex [dRu8NS] in n-NBu$_4^+$PF$_6^-$ (FIG. 1A) or NBu$_4^+$TFPB$^-$ (FIG. 1B) recorded at a sweep rate of 0.1 V/s at r.t. versus the CP$_2$Fe$^{0/+}$ reference couple.

Complex [dRu8NS] undergoes a single chemically and electrochemically reversible two-electrons oxidation redox wave at −95 mV versus the CP$_2$Fe$^{0/+}$ in CH$_2$Cl$_2$/n-NBu$_4$PF$_6$ (FIG. 1A) or −145 mV versus Cp$_2$Fe$^{0/+}$ in CH$_2$Cl$_2$/NBu$_4^+$TFPB$^-$ (FIG. 1B) reference couple scale, which refers to noteworthy negligible communication between the two remote redox-active end-groups. Attempts to separate the two redox waves failed even by using the NBu$_4^+$TFPB$^-$ electrolyte.

IR Spectro-electrochemistry
IR spectroelectrochemistry (SEC) is a quantitative and an informative tool used in this study to try to separate the two individual redox processes and to get a crucial insight into the ruthenium- versus divinylazobenzene bridge-based character of the individual redox processes. This can be fulfilled via investigating the changes in the energies and the band patterns for the degree of metal dπ/π*(C≡O) back-bonding upon accessible sequential oxidations, since those remarkable tokens are considered as an indicative measure of altering the electron density at the two ruthenium-vinyl moieties.

Figure 2:
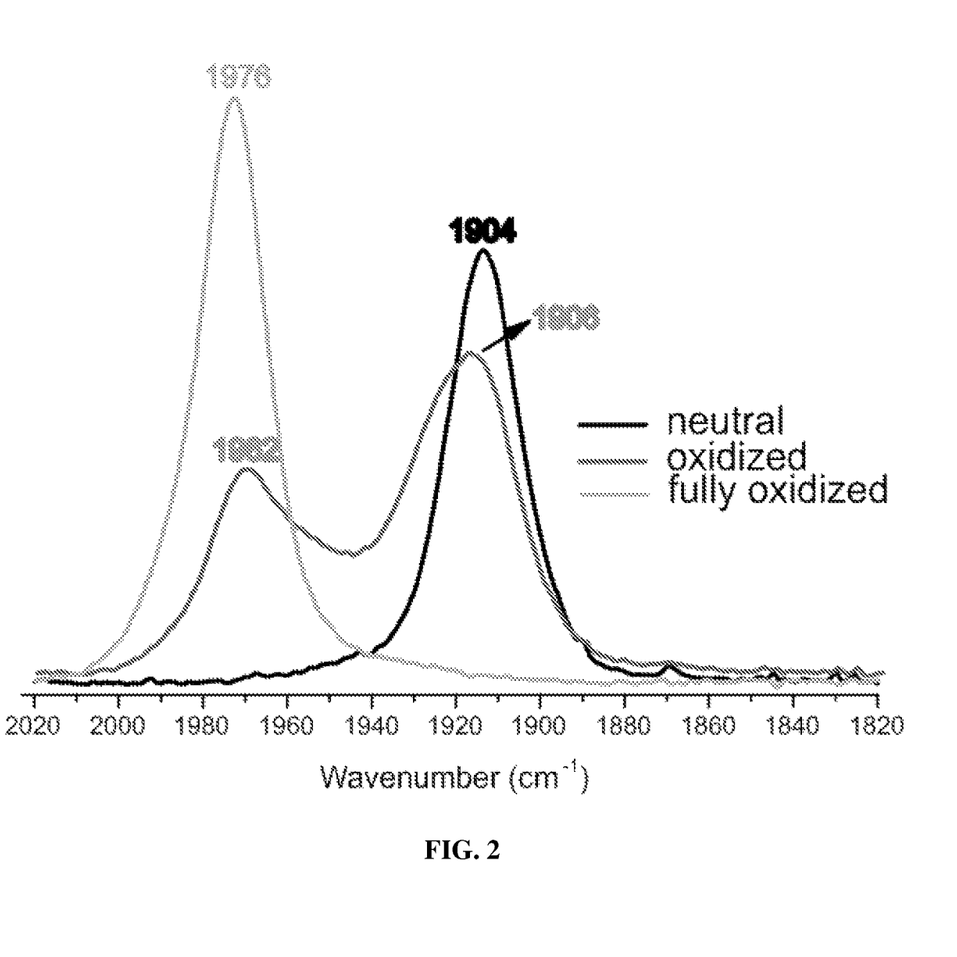
FIG. 2 shows IR spectroscopic changes in the range of the Ru(CO) bands upon the first and the second oxidation of complex [dRu8NS] in CH$_2$Cl$_2$/NBu$_4$PF$_6$.

Complex [dRu8NS] in its neutral state, shows classical intense vibrational bands at around 2950, 1904, 1550 and 1530 cm$^{-1}$ assigned to the C—H (aryl, vinyl), Ru(C≡O), (C≡N); and N≡N stretches, respectively. The low energy of the $\tilde{v}$ (CO) stretch band reflects, however, the high electron density at the two ruthenium-alkenyl moieties. First and second oxidations of this complex as depicted in FIG. 2 cleanly converted the neutral species to its corresponding mono- and di-cations in a stepwise fashion as indicated by distinct sets of isosbestic points. First radical cation of complex [dRu8NS] led to gradually replace the neutral Ru(CO) band at around 1904 cm$^{-1}$ into a pattern of two bands; a lower-energy shoulder band with a very slight shift at 1906 cm$^{-1}$ and other higher-energy band at 1962 cm$^{-1}$. As the oxidation proceeded to the di-cation, the two CO bands of mixed-valent (MV) complexes [dRu8NS]$^+$ are again blued-shifted and merged into a single band at 1964 cm$^{-1}$. This typical observation pattern confirms a weakly coupled Class I system of Robin-Day classification of MV states.

Catalytic Activity of the Hydrogenation of α,β-unsaturated Ketone 0.04 mmol of the [dRu8NS] complex, 4.0 mmol of trans-4-phenyl-3-butene-2-one, 0.2 mmol of KOH as a co-catalyst in 25 mL of isopropanol were placed in a 250 mL Schlenk flask. The reaction mixture was stirred well for 10 min and degassed by three freeze-thaw cycles and then pressurized with H$_2$ gas at 2.5 bars. The reaction mixture was continually stirred at 30° C. for 1 hr. During the hydrogenation process, samples were frequently taken from the reaction mixture after the H$_2$ gas was removed to determine the conversion percent and hence the turnover frequencies (TOFs). The samples were inserted into a gas chromatograph using a special syringe and compared with the authentic substrate sample.

Trans-4-phenyl-3-butene-2-one was used as an α,β-unsaturated ketone substrate to evaluate the hydrogenation catalytic activity of the complex [dRu8NS]. Three different possible hydrogenation products could be obtained. The most favorable selective hydrogenation of the C═O group gives the corresponding α,β-unsaturated alcohol. Hydrogenation of the C═C bond affords a saturated ketone while fully hydrogenation of both the C═O and C═C groups affords the less favorable a saturated alcohol. The hydrogenation process using complex [dRu8NS] as a catalyst in the presence of excess H$_2$ gas and a strong base, KOH as a co-catalyst in isopropanol as a solvent yielded selective hydrogenation of the C═O group with more than 99% of the corresponding α,β-unsaturated alcohol product after about 30 mins as depicted in Scheme 2 below. Reduction of the C═C or both C═C and C═O bonds on other hand, was not detected at all.

Scheme 2

It is to be understood that the 4,4'-divinylazoarylene-bridged diruthenium complex bearing two [{Ru(CO)(L-κ$^2$[N,S]$^{31}$ )(P$^i$Pr$_3$)$_2$}] entities, compositions containing the same, and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A 4,4'-divinylazoarylene-bridged diruthenium complex with a general formula [{Ru(CO)(L-κ$^2$[N,S]$^-$)(P$^i$Pr$_3$)$_2$}$_2$ (μ—{CH═CH—C$_6$H$_2$—($^i$Pr)$_2$-2,6}$_2$—N═N-4,4')] having the formula I:

2. A method of making the 4,4'-divinylazoarylene-bridged diruthenium complex with a general formula [{Ru(CO)(L-κ$^2$[N,S]$^-$)(P$^i$Pr$_3$)$_2$}$_2$(μ—{CH═CH—C$_6$H$_2$—($^i$Pr)$_2$-2,6}$_2$—N═N-4,4')] of claim 1, the method comprising:

stirring a mixture of 8-mercaptoquinoline and K$_2$CO$_3$ in a solvent mixture of CH$_2$Cl$_2$ and MeOH to obtain a solution;

adding the solution to a solution of [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] in a solvent of CH$_2$Cl$_2$ to obtain a reaction mixture;

stirring the reaction mixture;

removing the solvents under reduced pressure to obtain a precipitate;

washing the precipitate; drying the precipitate in vacuum; and obtaining the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')].

3. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein the reaction mixture is stirred for at least one hour.

4. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein the precipitate is yellow.

5. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein the precipitate is washed with n-hexane and MeOH.

6. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein washing the precipitate removes unreacted starting materials and any formed KCl.

7. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein the precipitate is dried in a vacuum.

8. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein the solution of 8-mercaptoquinoline and K$_2$CO$_3$ in the solvent mixture of CH$_2$Cl$_2$ and MeOH are stirred for at least about 15 minutes.

9. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein the solution of 8-mercaptoquinoline and K$_2$CO$_3$ in the solvent mixture of CH$_2$Cl$_2$ and MeOH are stirred at room temperature.

10. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] is obtained in an about 94% yield.

11. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein the 8-mercaptoquinoline and the K$_2$CO$_3$ are added in equimolar amounts.

12. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein the CH$_2$Cl$_2$ and MeOH in the solvent mixture of CH$_2$Cl$_2$ and MeOH are used in equal volumetric amounts.

13. The method of making the 4,4'-divinylazoarylene-bridged diruthenium complex with a general formula [{Ru(CO)(L-κ²[N,S]⁻)(P$^i$Pr$_3$)$_2$}$_2$(μ—{CH=CH—C$_6$H$_2$—($^i$Pr)$_2$-2,6}$_2$—N=N-4,4')] of claim 2, wherein stiffing the reaction mixture obtains a deep yellow solution.

* * * * *